(12) United States Patent
Torres (10) Patent No.: US 11,786,073 B1
(45) Date of Patent: Oct. 17, 2023

(54) MULTIFUNCTIONAL AND PORTABLE COOKING IMPLEMENT

(71) Applicant: Ismael C. Torres, Monroe, NC (US)

(72) Inventor: Ismael C. Torres, Monroe, NC (US)

( * ) Notice: Subject to any disclaimer, the term of this patent is extended or adjusted under 35 U.S.C. 154(b) by 0 days.

(21) Appl. No.: 18/113,051

(22) Filed: Feb. 23, 2023

Related U.S. Application Data (60) Provisional application No. 63/473,191, filed on May 9, 2022.

(51) Int. Cl.
*A47J 37/06* (2006.01)
*A47J 37/12* (2006.01)
*A47J 37/07* (2006.01)

(52) U.S. Cl.
CPC ......... *A47J 37/067* (2013.01); *A47J 37/0768* (2013.01); *A47J 37/129* (2013.01); *A47J 37/1266* (2013.01)

(58) Field of Classification Search
CPC .... A47J 37/067; A47J 37/1266; A47J 37/129; A47J 37/01; A47J 37/0629; A47J 37/0647; A47J 37/0704; A47J 37/0709; A47J 37/0713; A47J 37/0763; A47J 2037/0777
USPC .............................. 126/1 R, 25 R, 29, 275 R
IPC .................................. A47J 37/06,37/07, 37/12
See application file for complete search history.

(56) References Cited

U.S. PATENT DOCUMENTS

| | | | | |
|---|---|---|---|---|
| 470 A | * | 11/1837 | Hasting et al. | F24C 15/08 126/211 |
| 967,447 A | * | 8/1910 | Schmidt | A47J 37/0763 126/9 R |
| 1,066,595 A | * | 7/1913 | Freeman | F24B 1/205 126/29 |
| 2,576,409 A | * | 11/1951 | Michaelis | A47B 77/08 126/214 B |
| 2,900,045 A | * | 8/1959 | Conklin | A47J 36/2483 186/44 |
| 5,611,264 A | * | 3/1997 | Studer | A47J 37/067 99/449 |
| 5,676,043 A | * | 10/1997 | Best | A47J 37/0682 99/422 |
| 5,833,295 A |  | 11/1998 | Farlow, Jr. | |

(Continued)

FOREIGN PATENT DOCUMENTS

JP 01256916 A * 4/1988 ............. A47J 37/06

OTHER PUBLICATIONS

"18113051, Google Search History, 2023-05-20.pdf", Online Google Search, May 20, 2023. (Year: 2023).*

*Primary Examiner* — Steven B McAllister
*Assistant Examiner* — Daniel E. Namay
(74) *Attorney, Agent, or Firm* — Invention To Patent Services; Alex Hobson (57) ABSTRACT

A multifunctional and portable cooking implement includes a deep fryer module, a cooktop module and an oven-grill-griddle module, which may be configured between the deep fryer module and the cooktop module. The multifunctional and portable cooking implement provides a plurality of means to cook and warm food items in a compact form and may have legs that pivot about respective leg hinges to elevate the modules, above a ground surface. The exemplary multifunctional and portable cooking implement may have a length from a first end to a second end that is configured to fit within a truck bed and on a tailgate of a truck. A cover-countertop may be pivotably coupled to one or each end of the portable cooking implement to pivot open to provide countertop space for food preparation.

20 Claims, 7 Drawing Sheets

(56) References Cited

U.S. PATENT DOCUMENTS

| | | | | |
|---|---|---|---|---|
| 6,076,451 | A | * | 6/2000 | Studer ................... A47J 27/14 99/449 |
| 6,416,101 | B1 | | 7/2002 | Bartch |
| 6,736,050 | B1 | * | 5/2004 | Monn ................. A47J 37/0704 99/417 |
| 6,814,383 | B2 | | 11/2004 | Reed, III et al. |
| 6,915,797 | B1 | | 7/2005 | Lightbourne |
| 7,263,990 | B1 | | 9/2007 | Lenhart |
| 7,856,924 | B1 | * | 12/2010 | Stihi ................... A47J 37/0731 126/25 AA |
| 8,511,293 | B2 | * | 8/2013 | Thompson ............. A47B 81/00 126/30 |
| 8,820,313 | B1 | | 9/2014 | Lutes |
| 10,174,952 | B1 | | 1/2019 | King et al. |
| 10,322,661 | B2 | | 6/2019 | Babington et al. |
| 11,466,861 | B2 | | 10/2022 | Gross |
| 2008/0098902 | A1 | | 5/2008 | Mansfield et al. |
| 2013/0160755 | A1 | | 6/2013 | Amat I. Pujol |
| 2019/0256338 | A1 | * | 8/2019 | Moss ................... B67D 1/0891 |
| 2022/0151435 | A1 | * | 5/2022 | Nothum, Jr. ........ A47J 37/1247 |

* cited by examiner

MULTIFUNCTIONAL AND PORTABLE COOKING IMPLEMENT

CROSS REFERENCE TO RELATED APPLICATIONS

This application claims the benefit of priority to U.S. provisional patent application No. 63/473,191, filed on May 9, 2022; the entirety of which is incorporated by reference herein.

BACKGROUND OF THE INVENTION

Field of the Invention

The invention relates to a multifunctional and portable cooking implement including a griddle having a deep fryer module, a cooktop module and an oven-grill-griddle module.

Background

Portable cooking implements are becoming more popular as people attend tailgating events, camp, and the like. Portable cooking apparatus usually offers only one cooking means, such as a deep fryer, a cooktop or grill. There are many situations where multiple cooking means may be desired.

SUMMARY OF THE INVENTION

The invention is directed to an exemplary multifunctional and portable cooking implement including a deep fryer module, a cooktop module and an oven-grill-griddle module, which may be configured between the deep fryer module and the cooktop module. The exemplary multifunctional and portable cooking implement provides a plurality of means to cook and warm food items in a compact form and may have legs that pivot about respective leg hinges to elevate the modules, above a ground surface. The exemplary multifunctional and portable cooking implement may have a length from a first end to a second end that is configured to fit within a truck bed and on a tailgate of a truck.

An exemplary deep fryer module has a deep fryer with an opening to place food items into heated oil, and a deep fryer temperature controller to heat the oil to a desired temperature. The deep fryer cover-countertop is opened by pivoting about the deep fryer cover-hinge. A deep fryer cover-countertop may be configured to cover the deep fryer and may be pivotably connected to the deep fryer module to move from a closed position, over the deep fryer to an open position extending from the deep fryer to produce a countertop for tools, food items, spices and the like.

An exemplary cooktop module has a cooktop to cook food items thereon, and a cooktop temperature controller to heat the cooktop to a desired temperature. The cooktop module also has a storage drawer for storing items, such as cooking tools, tongs, spatulas and the like. The cooktop cover-countertop is opened by pivoting about the cooktop cover-hinge. A cooktop cover-countertop may be configured to cover the cooktop and may be pivotably connected to the cooktop module to move from a closed position, over the cooktop to an open position extending from the cooktop to produce a countertop for tools, food items, spices and the like.

An exemplary oven-grill-griddle module includes an oven to bake or warm food items, a griddle having smoke aperture therein to allow smoke from within the oven to rise up through the griddle. Also, the oven-grill-griddle module may include a collapsible grill assembly as described herein. The exemplary oven-grill-griddle module has a griddle having a griddle heating element that provides heat to an oven, or warming box, and also a collapsible grill. The collapsible grill is configured to be heated by the griddle, wherein a charcoal tray rests directly on the griddle and the collapsible grill extends around the charcoal tray to support a grill-grate above the charcoal. The entire grill assembly can be placed within the oven for transport and storage. The oven is configured under the griddle and receives heat from the griddle to provide a heated enclosure for food items and may be used to bake or otherwise heat or cook food items therein.

An exemplary oven-grill-griddle module comprises an oven having an enclosure that forms an interior for heating and cooking food items. The oven has a door to provide access to the food items and the oven door may have a window to allow viewing food items therein. The window may be configured in the door of the oven. The oven may also have rack brackets to allow a rack to be slid into the oven to provide additional area for placement of food items. The rack may be detachable from the oven, whereby the rack can be pulled out of the interior of the oven through the door. The rack brackets may be protrusions along the interior sides of the oven and the rack may rest on these protrusions.

An exemplary oven-grill-griddle module has a single heating element that may be configured in the top of the oven and a griddle may be configured over the heating element. In an exemplary embodiment, the heating element is between the griddle surface and the oven and may be part of the griddle or a separate heating element that the griddle rests over. In this way, the heating element may heat the oven while also heating the griddle to enable cooking items on the griddle and within the oven simultaneously. The griddle may be detachable from the oven. An insulating cover may be configured to be placed over the griddle or heating element to insulate the heating element and direct more heat into the oven for cooking food items in the oven. The insulating cover may be configured over the griddle or the griddle may be removed and the insulating cover may be configured for placement where the griddle was removed and may have a size and perimeter shape substantially the same as the griddle to enable the insulating cover to be retained over the heating element. The oven may reach a maximum temperature that is 50% greater or more, 100% greater or more, or even 150% or 200% greater or more than a max temperature of the oven without the insulating cover configured over the heating element.

The griddle may be metal and may have a perimeter shape that engages with the oven enclosure to retain the griddle in place. The griddle may seat within a recess of the top of the oven for example and the griddle may be configured to fit over the heating element and may have a recessed area on the base surface of the griddle for extending over the heating element. The griddle surface, or surface for cooking a food item thereon may be flat for high transfer of heat to food items such as burgers, eggs and the like. The flat, planar griddle surface may also enable easy cleaning. A griddle grill-groove may extend in the griddle surface for receiving and retaining the collapsible grill supports. The perimeter sides, or collapsible sides of the collapsible grill support may be inserted into the grooves and this engagement may prevent the perimeter sides from slipping or moving and provides additional retainment of the sides that increases weight carrying capacity of the collapsible grill assembly. The griddle grill-groove may be rectangular in shape and extend just inside the perimeter of the griddle on the griddle surface. The depth of the griddle grill-groove may be about 5 mm or more, about 10 mm or more and any range between and including the depths values provided.

The collapsible grill assembly is configured to be assembly over the griddle with the perimeter sides forming a collapsible grill support configured to receive the grill-grate thereon. The perimeter sides may be discrete sides or may be coupled together by a hinge. A hinge may be preferred as it is an integral engagement feature that retains the perimeter sides together. Two or more of the sides may be engaged by a hinge, such as three of the sides wherein one side is discrete from the other hinge-engaged sides. In an exemplary embodiment all four sides are engaged by a hinge between adjacent sides. The hinge in combination with the griddle grill-groove may be effective in securing the perimeter sides in position. The grill-grate may have stops or protrusions from the bottom surface that further retain the top of the perimeter sides in an erect position. A U-shaped protrusion from the base of the grill-grate may positively retain the top of the perimeter sides in position.

The exemplary multifunctional and portable cooking implement may have a length from a first end to a second end that is configured to fit within a truck bed and on a tailgate of a truck, such as about 40 inches or less, or about 48 inches or less, about 50 inches or less and any range between and including the length values provided. The exemplary multifunctional and portable cooking implement may have legs to elevate the modules up from a ground surface a height of about 10 inches or more, about 16 inches or more, about 20 inches or more, about 30 inches or more and any range between and including the values provided.

The multifunctional and portable cooking implement may be powered by electricity or gas, wherein heaters to heat the food items are resistive or inductive heaters and use electricity, or burn a fuel, such as propane or natural gas to produce heat.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be an included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
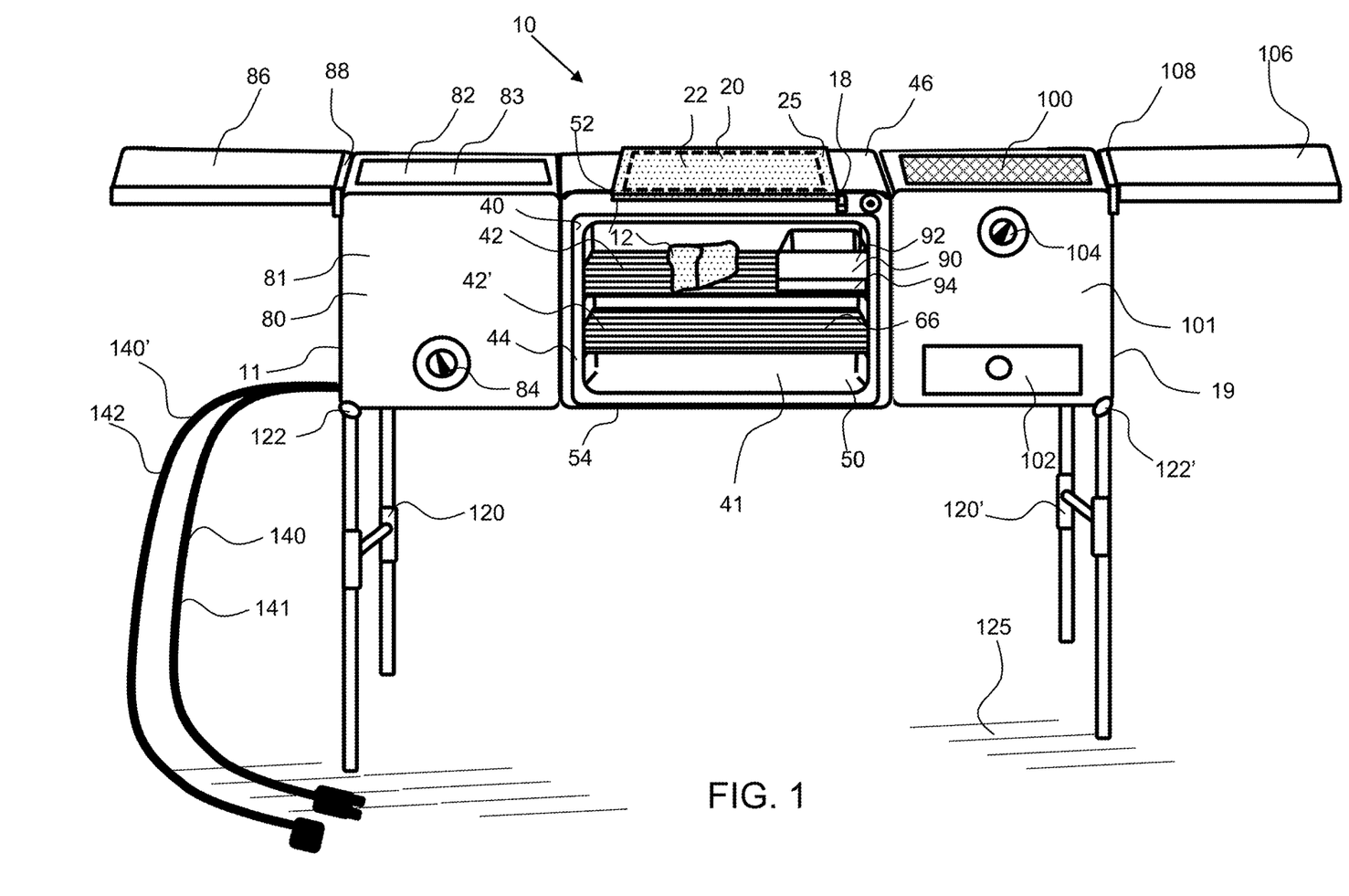
FIG. 1 shows an exemplary multifunctional and portable cooking implement comprising a deep fryer module, a cooktop module and an oven-grill-griddle module configured between the deep fryer module and the cooktop module and with the deep fryer cover-countertop and the cooktop cover-countertop open to provide a work space for food, utensils and for food preparation.
Figure 2:
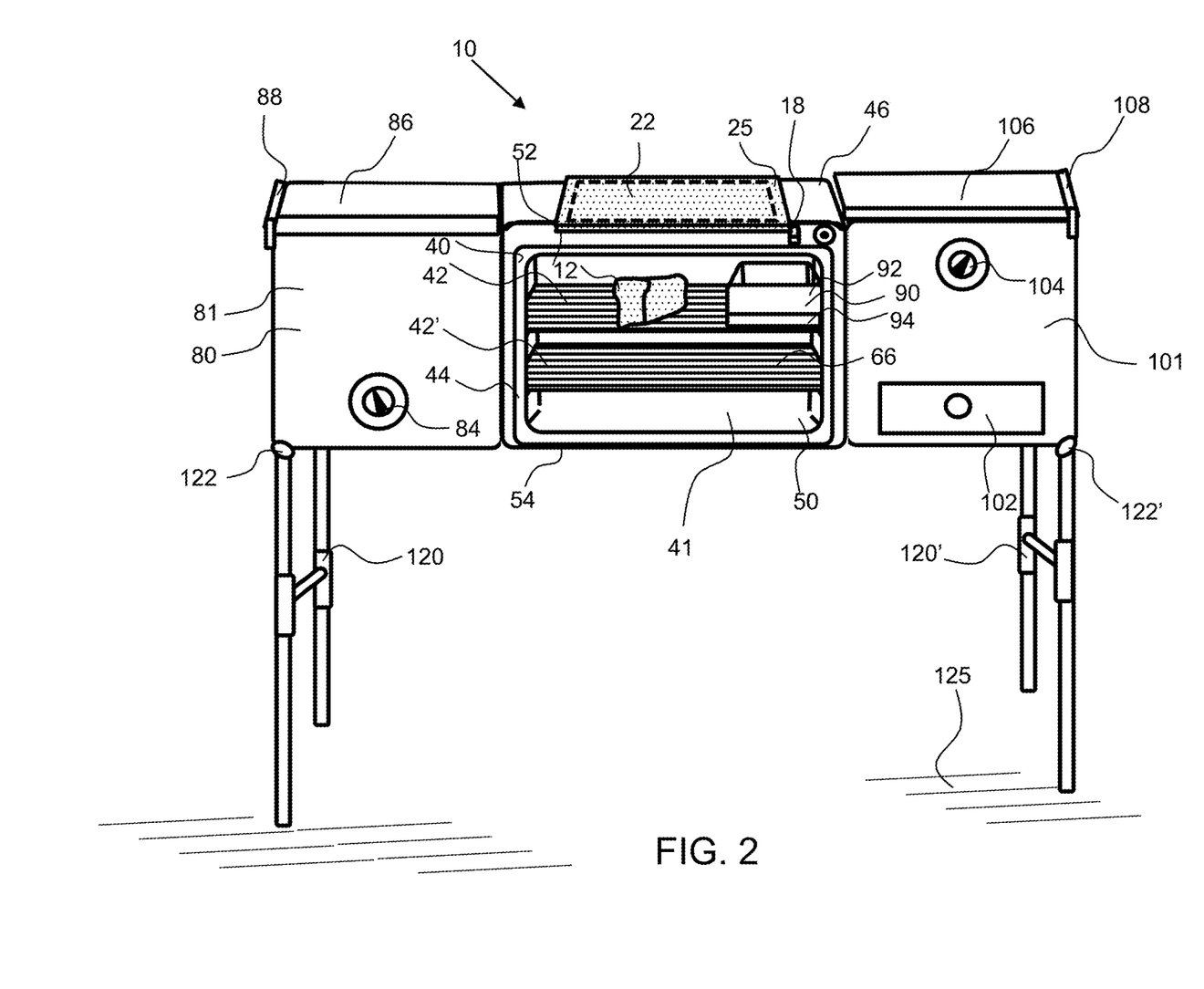
FIG. 2 shows the exemplary multifunctional and portable cooking implement of FIG. 1 with the deep fryer cover-countertop and the cooktop cover-countertop closed.
Figure 3:
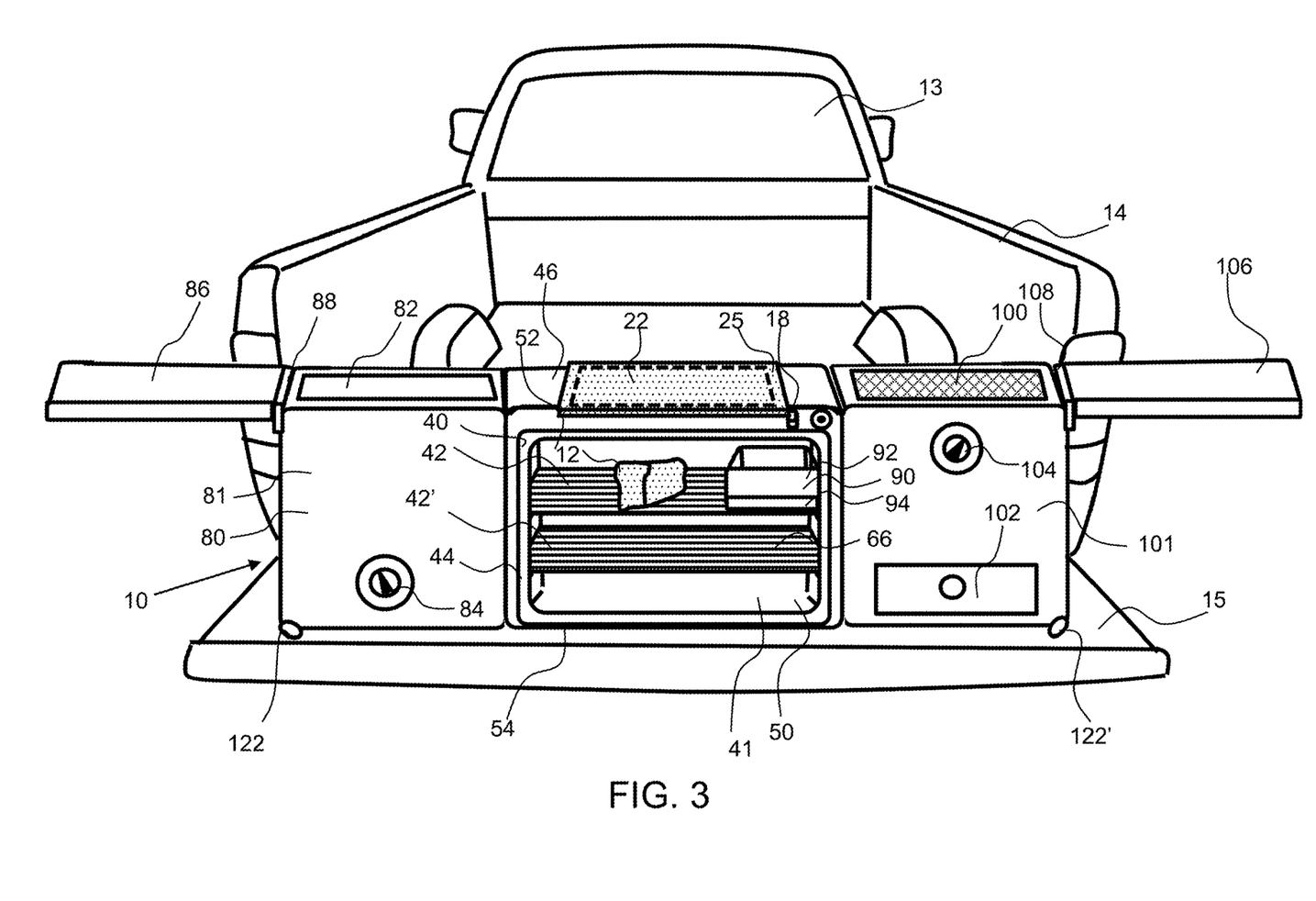
FIG. 3 shows the multifunctional and portable cooking implement shown in FIG. 1 configured in a truck-bed and on the tail-gate.

Referring now to FIGS. 1 to 3, an exemplary multifunctional and portable cooking implement 10 comprises a deep fryer module 81, a cooktop module 101 having a cooktop 100, and an oven-grill-griddle module 41 configured between the deep fryer module and the cooktop module. The exemplary multifunctional and portable cooking implement 10 provides a plurality of means to cook and warm food items in a compact form. As shown in FIGS. 1 and 2, the exemplary multifunctional and portable cooking implement 10 has legs 120, 120' that pivot about a respective leg hinge 122, 122' to elevate the modules, above a ground surface 125. As shown in FIG. 1, the exemplary multifunctional and portable cooking implement 10 has a length from a first end 11 to a second end 19.

The deep fryer module 81 has a deep fryer 80 with an opening 82 to place food items into heated oil 83, and a deep fryer temperature controller 84 to heat the oil to a desired temperature. The deep fryer cover-countertop 86 is opened by pivoting about the deep fryer cover-hinge 88.

The cooktop module 101 has a cooktop 100 to cook food items thereon, and a cooktop temperature controller 104 to heat the cooktop to a desired temperature. The cooktop module 101 also has a storage drawer 102 for storing items, such as cooking tools, tongs, spatulas and the like. The cooktop cover-countertop 106 is opened by pivoting about the cooktop cover-hinge 108.

The oven-grill-griddle module 41 includes an oven 40 to bake or warm food items, a griddle 20 having smoke aperture 30 therein to allow smoke from within the oven to rise up through the griddle. Also, the oven-grill-griddle module 41 may include a collapsible grill assembly as described herein.

As shown in FIG. 1, the exemplary multifunctional and portable cooking implement 10 has power connectors 140, 140', such as a fuel line 142 to provide combustible fuel for providing power for heating and cooking and/or an electrical power cord 141 that is configured to be plugged into a receptacle to supply electrical power for heating and cooking. The exemplary multifunctional and portable cooking implement 10 may have an on/off switch 18.

As shown in FIG. 2, the exemplary multifunctional and portable cooking implement 10 is configured with the deep fryer cover-countertop 86 and the cooktop cover-countertop 106 closed.

As shown in FIG. 3, the multifunctional and portable cooking implement 10 shown in FIG. 1 is configured in a truck-bed and on the tail-gate 15 of a truck 13. The multifunctional and portable cooking implement 10 may be configured to fit within the truck-bed 14 of the truck 13.

Figure 4:
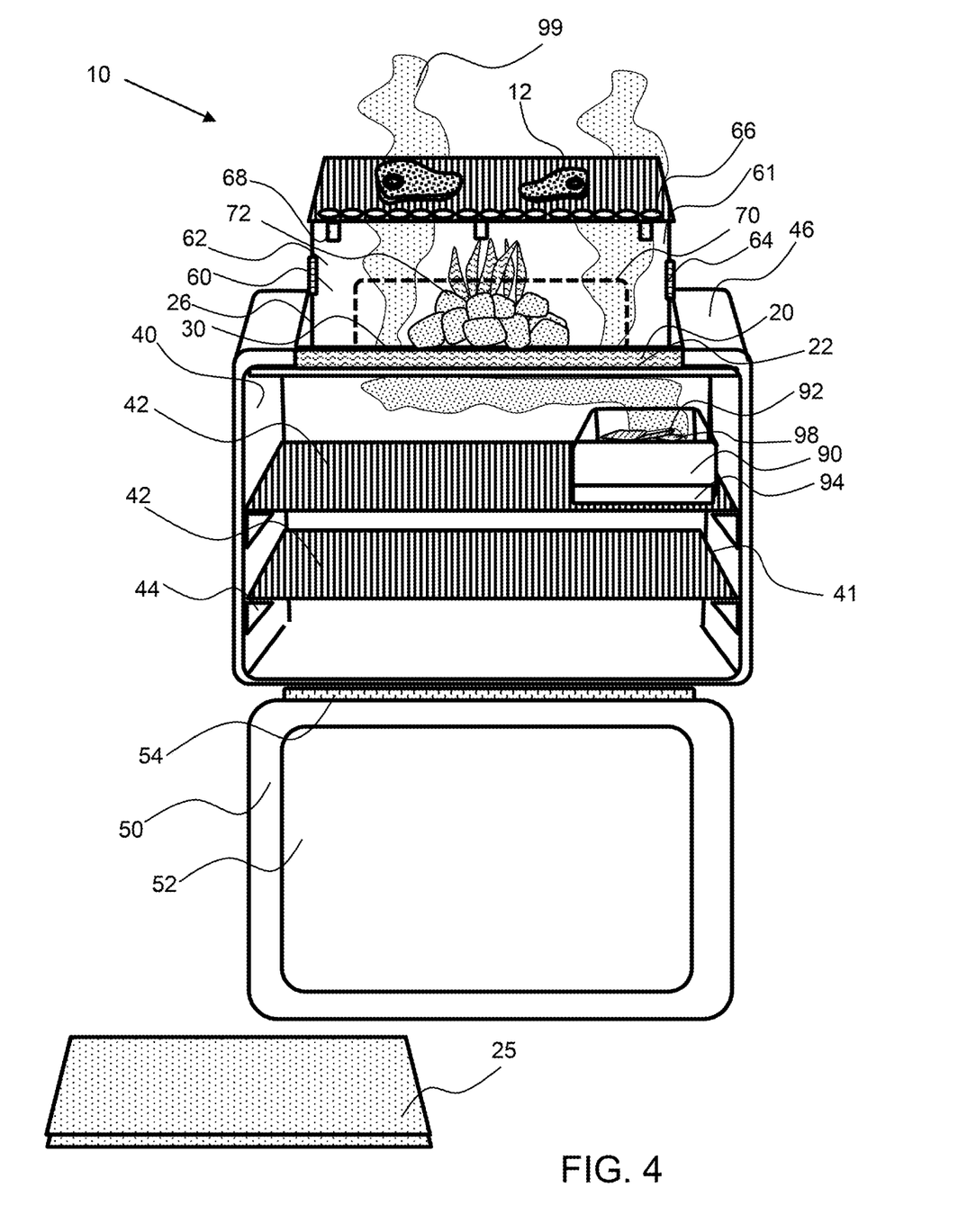
FIG. 4 shows an exemplary multifunctional and portable cooking implement that includes a griddle having a griddle heating element that provides heat to an oven, or warming box, and also a collapsible grill that is configured to sit atop the griddle to receive heat from the griddle.

Referring now to FIGS. 4 to 8, the components and configurations of the exemplary oven-grill-griddle module 41 shown in FIGS. 1 to 3, are described in more detail. As shown in FIG. 4, an exemplary multifunctional and portable cooking implement 10 includes a griddle 20 that is configured to be heated by a heating element 22. The heating element is configured between the griddle and the oven 40. The heating element provides heat to both the oven 40, or warming box, and also the griddle to enable cooking food items on the griddle and in the oven simultaneously. Also, the heating element provides heat for a collapsible grill assembly 60 that is sitting atop the griddle to receive heat from the griddle. The griddle is heating the charcoal 72 within the charcoal tray 70, which may be a disposable aluminum cooking pan. The collapsible grill support 61 includes perimeter sides 62 that can detach or fold to enable the sides to stack one atop another. The perimeter sides may be configured in a griddle grill-groove, a groove in the griddle surface, or top surface, to receive the bottom of the perimeter sides. This provides for a more positive engagement of the collapsible grill support 61 with the griddle. The collapsible grill assembly includes a grill grate 66 that is configured to rest on the top of the perimeter sides 62 to support a food item 12 for cooking. The grill-grate may have grill-grate side retainers 68, such as protrusions from the bottom of the grill-grate 66 to receive the top of the perimeter sides 62 of the collapsible grill support 61. The grill-grate side retainers 68 may be U-shaped protrusions. The perimeter sides may be coupled together by hinges 64.

A smoker 90 may be configured in the oven 40 and provide a flow of smoke 99 up through smoke aperture 30 in the top of the oven 40 or griddle 20. This smoke 99 may flow through the collapsible grill support 61 and up through the grill grate 66 to flavor the food item 12 as it cooks.

The oven door 50 of the oven 40 is open and the door has an oven-door window 52 to allow content within the oven to be viewed without opening the oven door 50. The oven door 50 is coupled to the oven 40 by a hinge 54. A couple of racks 42, 42' are configured within the oven 40 to allow more food items to be stored and warmed or cooked within the oven. The oven receives heat from the heating element 22. The heating element 22 therefore preforms multiple functions, it provides heat to both the griddle 20 and to the oven 40 and it heats the charcoal 72 for the collapsible grill assembly 60.

Figure 5:
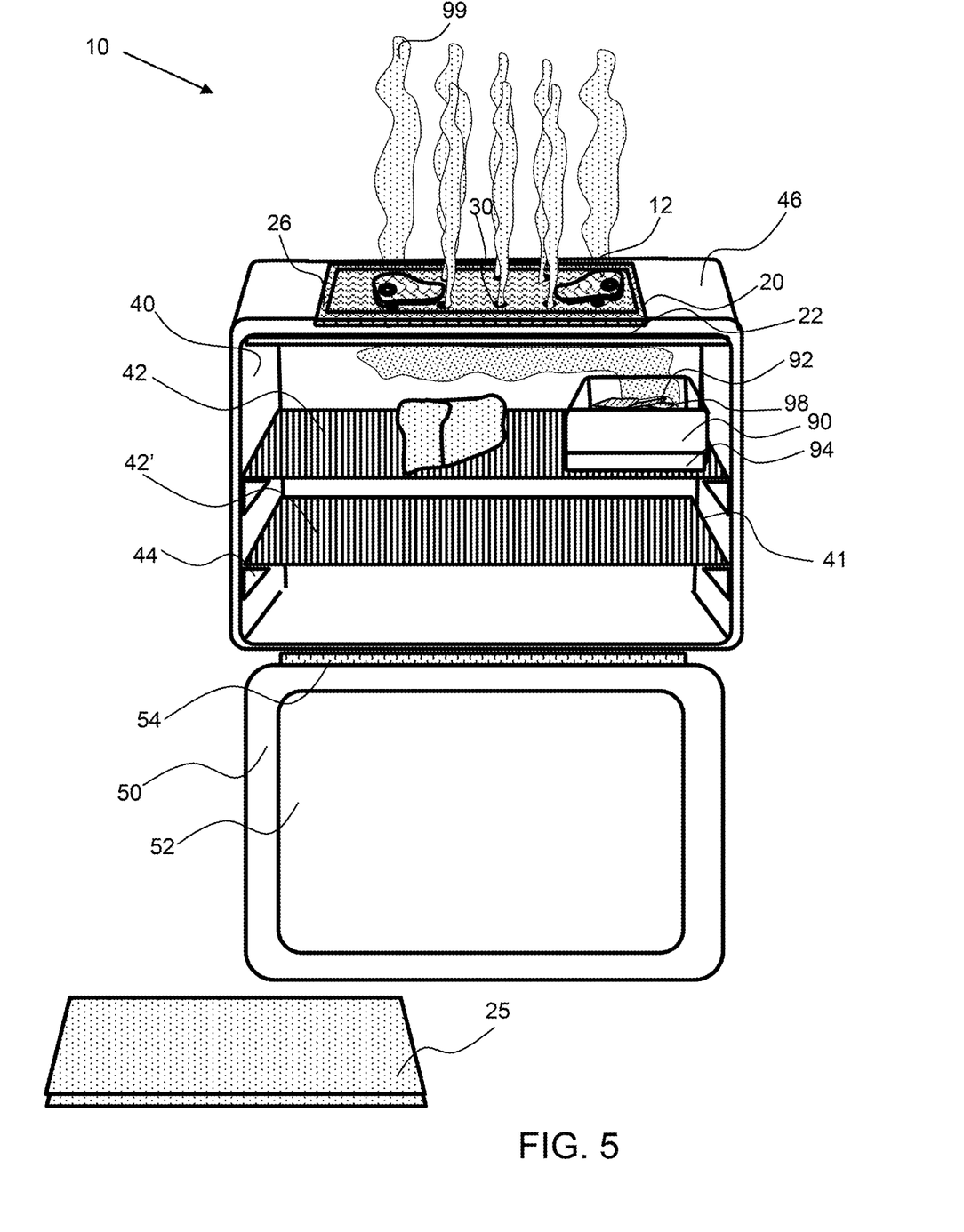
FIG. 5 shows the exemplary multifunctional and portable cooking implement shown in FIG. 1 with the collapsible grill removed and with a second food item in the oven.

As shown in FIG. 5, the exemplary multifunctional and portable cooking implement 10 shown in FIG. 4 now has the collapsible grill assembly 60 removed from the top 46 of the oven. The food items 12 are being cooked directly on the griddle 20. The smoker 90 has a chip enclosure 92 for retaining wood chips 98 that produce smoke that flows through the smoke apertures 30 to flavor the food item 12 as it cooks. The smoker 90 may have a dedicated wood-chip heater 94. The griddle grill-groove 26 is now more clearly shown extending inside the perimeter of the griddle. The insulating cover 25 is shown and as described herein, can be used to thermally insulate the heating element 22 to more effectively direct heat into the oven. The oven has rack brackets 44 for securing the racks 42, 42' within the interior of the oven.

Figure 6:
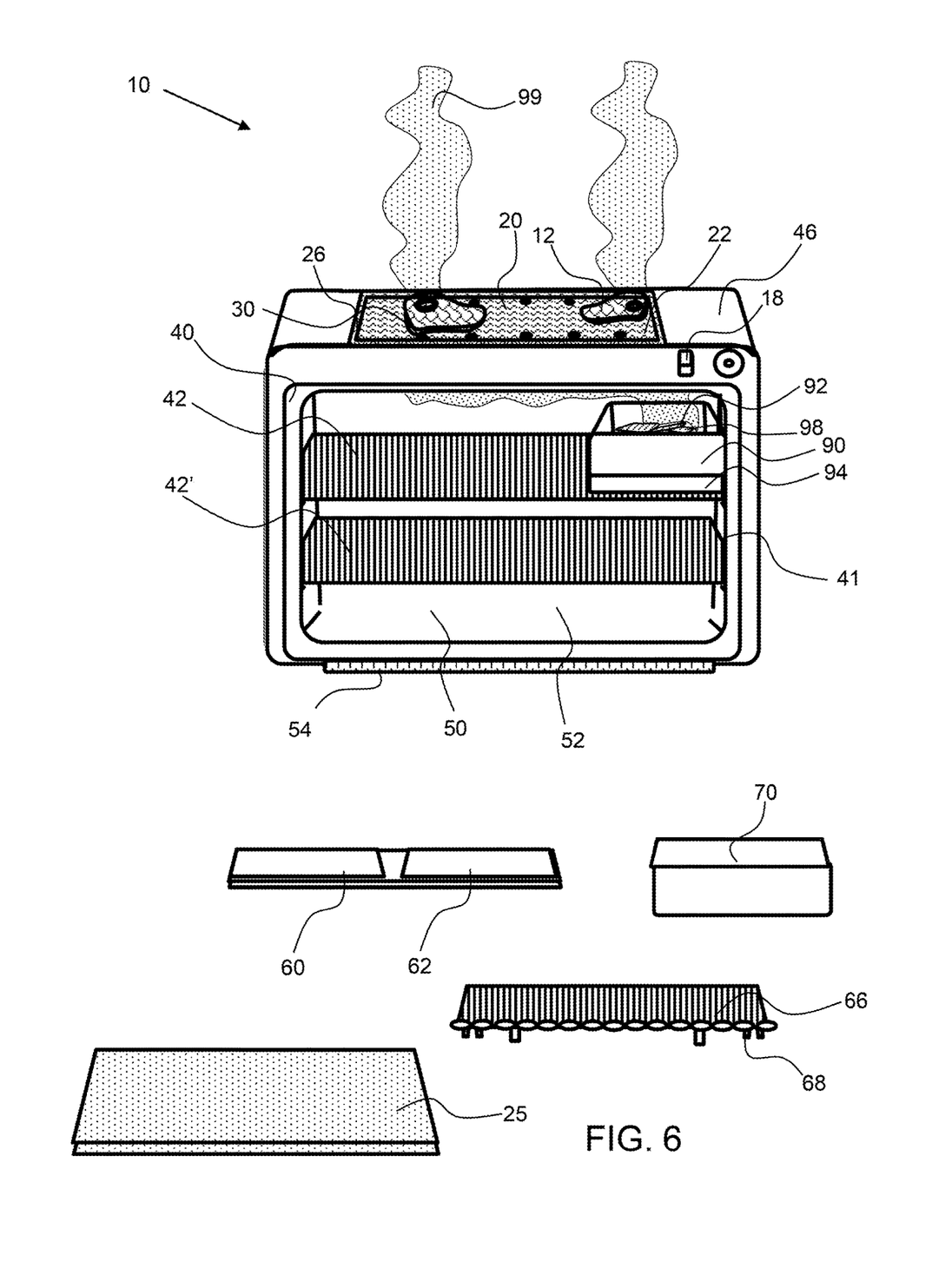
FIG. 6 shows the exemplary multifunctional and portable cooking implement being used to cook a food item with the portable grill assembly removed.

As shown in FIG. 6, the exemplary multifunctional and portable cooking implement 10 is being used to cook food items 12 with the portable grill assembly removed and with the oven door 50 now closed. The oven door window 52 enables viewing the contents within the oven.

Figure 7:
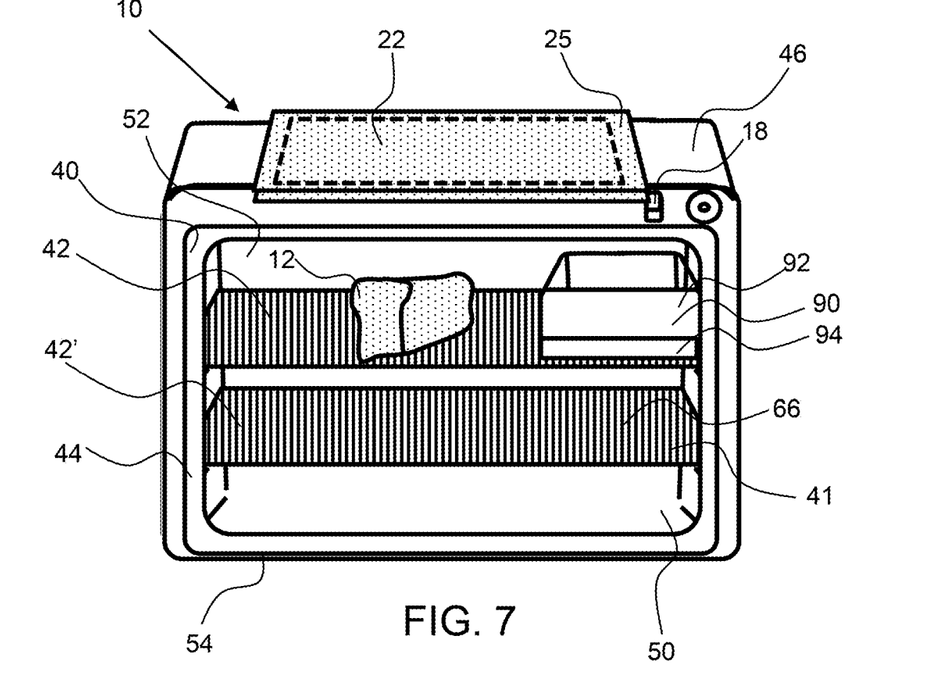
FIG. 7 shows the exemplary multifunctional and portable cooking implement configured for cooking a food item in the oven with the insulating cover configured over the heating element to direct heat into the oven.

As shown in FIG. 7, the exemplary multifunctional and portable cooking implement 10 is configured for cooking a food item 12 in the oven 40 with the insulating cover 25 configured over the heating element 22 (shown in dashed lines) to direct heat into the oven. Note that the insulating cover may be configured for placement over the griddle, not shown, or the griddle may be detachable and the insulating cover may be configured for placement where the griddle was removed. As shown, the heating element is heating the interior of the oven and cooking the food item 12, a loaf of bread.

Figure 8:
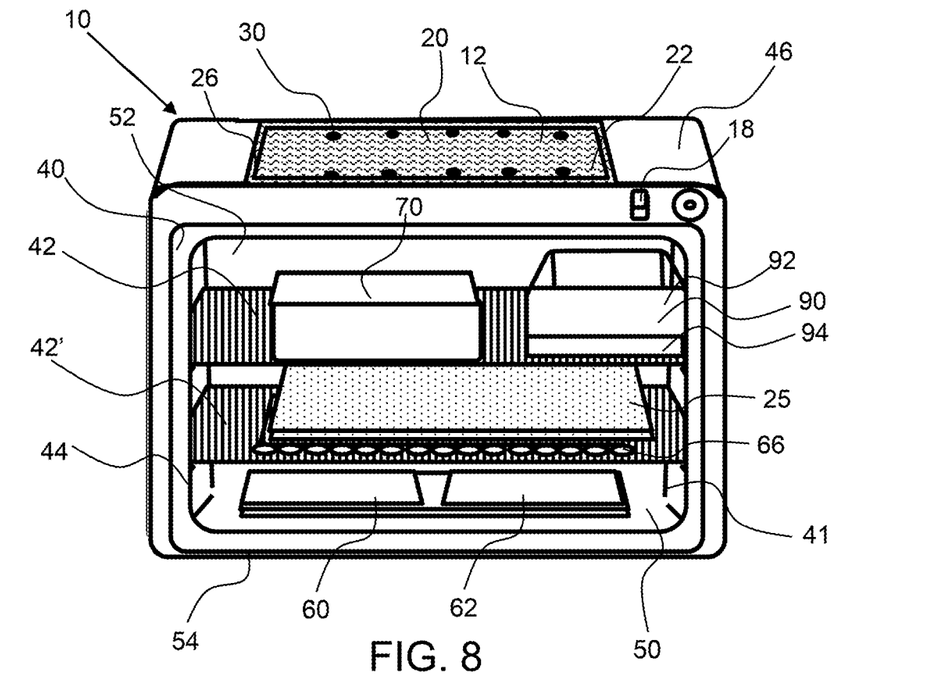
FIG. 8 shows the exemplary multifunctional and portable cooking implement configured for transport with the portable grill assembly configured within the oven along with the insulating cover.

As shown in FIG. 8, the exemplary multifunctional and portable cooking implement 10 is configured for transport with the portable grill assembly 60 configured with the oven 40 along with the insulating cover 25.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A multifunctional and portable cooking implement comprising:
   a) an oven-grill griddle module comprising:
      i) an oven comprising:

an oven enclosure around an interior of said oven, said enclosure having a top side and a base;
an oven door to provide access to said interior of said oven;
ii) a griddle configured on said top side of said oven;
iii) a heating element configured between the oven and the griddle;
iv) a collapsible grill assembly comprising:
a collapsible grill support forming perimeter sides of said collapsible grill assembly;
a grill-grate configured to extend over the collapsible grill support and configured to support a food item for grilling;
a charcoal tray configured to receive charcoal therein for grilling and wherein the charcoal tray is configured for placement within said perimeter sides of the collapsible grill support and on the griddle for receiving heat from the griddle;
wherein the oven is heated by said heating element;
b) a deep fryer module comprising a deep fryer and a deep fryer temperature controller;
c) a cooktop module comprising a cooktop and a cooktop temperature controller;
d) a pair of legs to elevate the multifunctional and portable cooking implement up above a ground surface at least 16 inches from said ground surface.

2. The multifunctional and portable cooking implement of claim 1, wherein the oven further comprises a rack bracket and rack that is configured to be supported within the interior of the oven by said rack bracket.

3. The multifunctional and portable cooking implement of claim 1, further comprising a smoker including a wood chip enclosure configured with the oven.

4. The multifunctional and portable cooking implement of claim 3, wherein the oven and the griddle each have a plurality of smoke apertures to allow smoke from the smoker to pass out through the smoke apertures and onto a food item on the griddle or onto a food item on the grill-grate of the collapsible grill assembly.

5. The multifunctional and portable cooking implement of claim 4, wherein the smoker has a wood-chip heater configured to heat the wood chips to produce smoke.

6. The multifunctional and portable cooking implement of claim 1, wherein the griddle has a griddle grill-groove around a perimeter of the griddle receiving the perimeter sides of the collapsible grill assembly therein.

7. The multifunctional and portable cooking implement of claim 6, wherein the perimeter sides of the collapsible grill support are configured to extend in said griddle grill-groove to secure the collapsible grill assembly to the griddle and to direct heat up through the collapsible grill assembly through the grill grate.

8. The multifunctional and portable cooking implement of claim 1, wherein the griddle has an area that is at least 50% of an area of the top of the oven.

9. The multifunctional and portable cooking implement of claim 1, wherein the charcoal tray is a collapsible aluminum pan having a thickness of no more 0.125 in.

10. The multifunctional and portable cooking implement of claim 1, further comprising a power cord configured for connecting with an electrical power source and wherein the heating element is electric.

11. The multifunctional and portable cooking implement of claim 10, wherein the smoker has a wood-chip heater configured to heat the wood chips to produce smoke and wherein the wood-chip heater for the smoker is an electric heater.

12. The multifunctional and portable cooking implement of claim 1, wherein the pair of legs are configured to pivot about a respective leg hinge.

13. The multifunctional and portable cooking implement of claim 1, wherein the deep fryer module is configured on a first end of the multifunctional and portable cooking implement and the cooktop module is configured on a second end of the multifunctional and portable cooking implement, opposite the first end.

14. The multifunctional and portable cooking implement of claim 1, wherein the deep fryer module further comprises a deep fryer cover-countertop that is configured to open from a closed position over the deep fryer about a deep fryer cover hinge to an open position to produce a deep fryer countertop extending from a first end of the multifunctional and portable cooking implement.

15. The multifunctional and portable cooking implement of claim 14, wherein the cooktop module further comprises a cooktop cover-countertop that is configured to open from a closed position over the cooktop about a cooktop cover hinge to an open position to produce a cooktop countertop extending from a second end of the multifunctional and portable cooking implement.

16. The multifunctional and portable cooking implement of claim 14, wherein the cooktop module further comprises a cooktop cover-countertop that is configured to open from a closed position over the cooktop about a cooktop cover hinge to an open position to produce a cooktop countertop extending from a second end of the multifunctional and portable cooking implement.

17. A method of cooking comprising:
a) providing the multifunctional and portable cooking implement of claim 1;
b) powering on the heating element to heat the griddle and to also heat the oven;
c) placing a first food item in the interior of the oven to cook the first food item within the oven; and
d) while cooking the first food item, cooking a second food item by placing a second food item on the griddle to be cooked on the griddle, or by assembling the collapsible grill assembly on the griddle, placing charcoal in the charcoal tray and placing the charcoal tray on the griddle and said second food item on the grill and grilling the second food item.

18. The method of cooking of claim 17, further comprising placing wood chips in the smoker;
heating the wood chips with the wood-chip heater;
wherein the oven and the griddle each have a plurality of smoke apertures to direct smoke from the smoker through the smoke apertures and onto a food item on the griddle or onto a food item on the grill-grate of the collapsible grill assembly.

19. The method of claim 17, wherein the griddle has a griddle-groove around a perimeter of the griddle for collecting griddle fluids therein.

20. The method of claim 19, wherein the collapsible grill support is configured to extend in said griddle-groove to secure the grill to the griddle and to direct heat up through the collapsible grill assembly and through the grill grate.

* * * * *